May 12, 1942. J. D. SPALDING 2,282,616
DRAWWORKS
Original Filed Feb. 12, 1940 2 Sheets-Sheet 1

Inventor
John D. Spalding
By Lyon & Lyon
Attorneys

May 12, 1942.　　J. D. SPALDING　　2,282,616
DRAWWORKS
Original Filed Feb. 12, 1940　　2 Sheets-Sheet 2

Inventor
John D. Spalding
By Lyon & Lyon
Attorneys

Patented May 12, 1942

2,282,616

UNITED STATES PATENT OFFICE 2,282,616

DRAW WORKS

John D. Spalding, Los Angeles, Calif., assignor to The National Supply Company, Pittsburgh, Pa., a corporation of Pennsylvania Original application February 12, 1940, Serial No. 318,513, now Patent No. 2,235,088, dated March 18, 1941. Divided and this application September 17, 1940, Serial No. 357,137

9 Claims. (Cl. 254—187)

This invention relates to releasable clutches of the positive engagement type, and more particularly to a drawworks construction incorporating therein a clutch for the driving of the spooling drum thereof.

This application is a division of my application, Serial No. 318,513, filed February 12, 1940, for Drawworks, patented March 18, 1941, as Patent No. 2,235,088.

An object of this invention is to provide a drawworks including a driving member and a spooling drum and a releasable clutch of the positive engagement type for establishing driving relationship between the said driving member and the drum.

Another object of this invention is to provide a clutch for driving a hoisting drum which is of the positive engagement type and which is not supported on the driving member or the drum.

Another object of this invention is to provide a releasable clutch for establishing the driving connection between a pair of relatively rotatable coaxial members, which clutch includes an annular series of external splines at one end connecting it to one of the members and a set of driving jaws at the other end for releasably engaging the other member.

Another object of this invention is to provide a releasable clutch of the positive engagement type including a single element mounted upon a drum shaft of a hoisting device together with means for selectively connecting said element either to a driving member or to a braking member.

Other objects and advantages of this invention it is believed will be apparent from the following detailed description of a preferred embodiment thereof as illustrated in the accompanying drawings.

Figure 1:
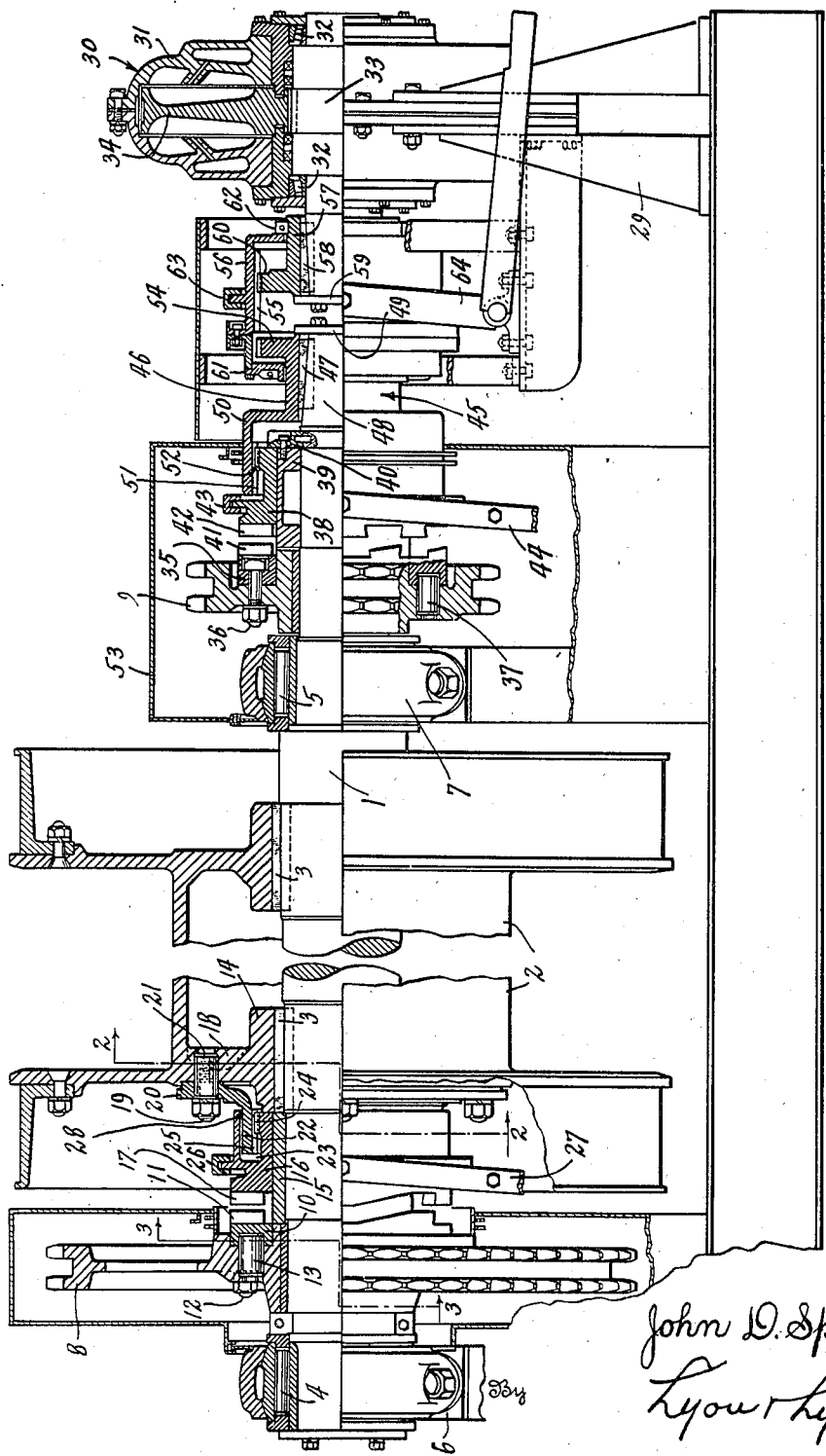
Figure 1 is an elevation partly in vertical mid-section of a portion of a hoisting apparatus or drawworks embodying my invention.
Figure 2:
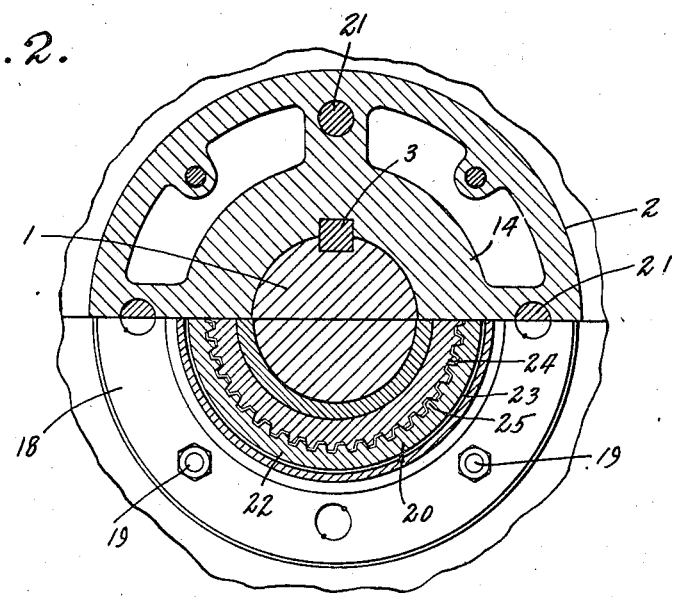
Figure 2 is a sectional end view taken substantially on the line 2—2 of Figure 1.
Figure 3:
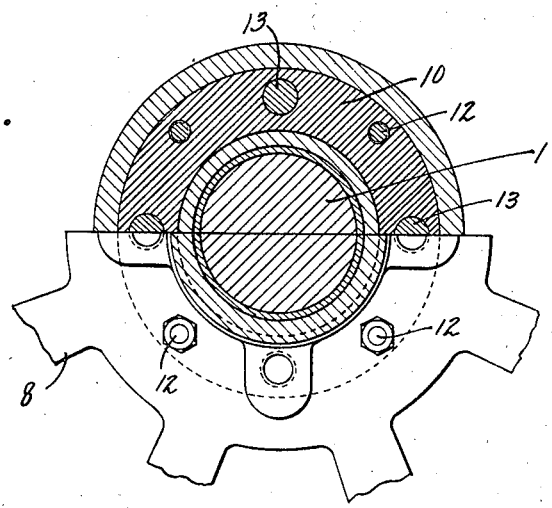
Figure 3 is a sectional end view taken substantially on the line 3—3 of Figure 1.

In the preferred embodiment of my invention illustrated in the accompanying drawings, 1 indicates a drum shaft of a drawworks or other hoisting apparatus. Secured to the drum shaft 1 is a spooling drum 2 which is held from relative rotation by means of keys 3. The shaft 1 is supported by bearings 4 and 5 carried upon supports 6 and 7. The drum 2 is located between the bearings 4 and 5. Means are provided for driving the shaft 1 or the drum 2 and are herein illustrated as including a sprocket 8 journaled upon the shaft 1 providing a slow speed drive and a sprocket 9 likewise journaled on the shaft 1 and providing a higher speed drive.

Means are provided for clutching the sprocket 8 directly to the drum 2 so that the driving torque is not transmitted through the drum shaft 1, and this means includes a clutch ring 10 having clutch jaws 11 which is secured to the hub of the sprocket 8 by means of bolts 12. Drive pins 13 are interposed between the hub of the sprocket 8 and the clutch ring 10 to relieve the bolts 12 of the driving torque.

Interposed upon the shaft 1 between the hub of the sprocket 8 and the hub 14 of the hoisting drum 2 is a sleeve 15 which operates to hold the parts in definite spaced relation. Journaled on the sleeve 15 is a clutch ring 16 having complementary clutch jaws 17 adapted to engage the clutch jaws 11.

Secured to the flange 18 of the hoisting drum 2 by means of bolts 19 is a driving flange 20. The driving flange 20 is connected with the flange 18 by means of driving pins 21 which take the driving torque from the bolts 19. The driving flange 20 has a horizontally extending cylindrical section 22 which extends within an annular recess 23 formed in the clutch ring 16.

Gear teeth 24 and 25 within the annular recess 23 on the exterior of the clutch ring 16 and upon the interior of the cylindrical section 22 provide a spline connection therebetween permitting relative axial movement while maintaining a driving engagement.

A shifter ring 26 is carried upon the clutch ring 16 and is connected with the shifter lever 27 permitting the clutch ring to be moved in a direction axially of the shaft 1 to bring jaws 11 and 17 into engagement.

The cylindrical recess 23 operating in conjunction with the interior of the flange 20 provides an annular lubricant chamber within which lubricant is maintained for lubricating the spline connection. A sealing ring 28 may be provided to prevent lubricant escape.

Mounted upon the supports 29 is a fluid brake 30 which may be of the type shown and described in the De La Mater Patent No. 1,992,911 which is adapted to be releasably connected to the drum shaft 1. The brake 30 is supported upon the supports 29 by the housing 31. Mounted within the housing 31 upon spaced bearings 32 is a shaft 33 which carries a brake rotor 34. The shaft 33 is mounted in substantial axial alignment with the shaft 1. Means are provided for releasably clutching the drum shaft 1 either to the sprocket 9 or to the fluid brake shaft 33. This means includes a clutch mechanism substantially like that heretofore described for clutching the sprocket 8 to the drum 2 in that it includes a clutch ring 35 secured to the sprocket 9 by bolts 36 and maintained in driving relation therewith by means of drive pins 37. The clutch ring 38 is journaled upon a sleeve 39 mounted upon the shaft 1 and held from longitudinal movement therealong by means of the retainer 40.

Interposed between the clutch rings 35 and 38 are the clutch dogs 41 and 42, respectively. The clutch ring 38 is adapted to be shifted in a direction axially of the shaft 1 by means of a shifter ring 43 operated by a shifting lever 44.

A single driving hub 45 is provided for connecting the shaft 1 with the clutch ring 38 or with the shaft 33 so that the drum 2 may be driven from the sprocket 9 or so that the brake 33 may be applied to retard rotation of the drum 2. This single driving element 45 includes a sleeve section 46 which is keyed as indicated at 47 to the tapered end section 48 of the shaft 1. A retaining plate 49 is secured to the end of the shaft to hold the driving member in position thereon.

Formed integral with the sleeve 46 is a cylindrical housing 50 provided on its interior with the spline teeth 51 adapted to mesh with the exterior spline teeth 52 formed on the clutch ring 38. The cylindrical portion 50 thus extends to within the foreign matter excluding lubricant retaining housing 53 which surrounds the sprocket 9 and insures the maintenance of lubricant required for the effective sliding of the spline gears 51 and 52.

Formed on the opposite end of the driver 45 is an external gear 54 providing an external spline adapted to mesh with the internal spline teeth 55 formed on the interior of the shiftable sleeve 56. The hub 57 is secured by a key 58 upon the tapered end of the shaft 33 and is held from endwise displacement by means of a retaining ring 59 secured to the end of the shaft 33. The hub 57 is formed with an external gear 60 meshing with the internal spline gear 55 of the sleeve 56. The sleeve 56 is provided with a removable end cap 61 which encircles upon the sleeve section 46 of the driver 45. A stop ring 62 is secured to the hub 57 to limit endwise movement of the shiftable sleeve 56. A shifting ring 63 is provided for shifting the sleeve 56 and a shifting lever 64 is secured to the shifting ring 63. It will be observed that the driving member 45 constitutes a single element through which power may be imparted to the drum 2 from the sprocket 9, or absorbed from the drum 2 by means of the fluid brake 30.

Having fully described my invention, it is to be understood that I do not wish to be limited to the details herein set forth, but my invention is of the full scope of the appended claims.

I claim:

1. In a hoisting mechanism, the combination of a drum secured upon a shaft, drive means adapted to rotate said shaft including a driving element rotatably mounted on said shaft, a hub element axially spaced from said drive element and non-rotatably fixed on said shaft, one of said elements being provided with an annular series of internal spline teeth extending axially of and encircling a portion of said shaft, the other of said elements being provided with a plurality of driving jaws, a clutch positioned between said hub element and said driving element and supported independently of either, said clutch having an annular series of external spline teeth at one end adapted to slidably and non-rotatably engage within said internal spline teeth, a plurality of driving jaws on the other end of said clutch, means to shift said clutch axially of said shaft to bring said jaws into engagement, whereby the driving element may impart rotation to said shaft, a brake device, and means to releasably connect said brake device in operative relation with said hub element, whereby the brake device may act through said hub element to impede rotation of said shaft.

2. In a hoisting mechanism, the combination of a drum shaft assembly including a drum secured upon a shaft, drive means adapted to rotate said assembly including a driving element rotatably mounted on said shaft, a hub element non-rotatably fixed on said assembly, a fluid brake, and clutch means for selectively connecting either the driving element or the fluid brake in driving relation with said hub element.

3. In a hoisting mechanism, the combination of a shaft, spaced bearings for supporting said shaft, a spooling drum secured upon said shaft intermediate said bearings, a hub element non-rotatably fixed on one end of said shaft, a driving member, a braking member, and clutch means for selectively connecting either of said members in direct driving relation with said hub element.

4. In a hoisting mechanism, the combination of a shaft, spaced bearings for supporting said shaft, a spooling drum secured upon said shaft intermediate said bearings, a driving member, a braking member, a hub element secured upon said shaft and positioned intermediate said members, clutch means for establishing a releasable driving connection between said driving member and said hub element, and additional means independent of said clutch means for releasably connecting said braking member and said hub element.

5. In a hoisting mechanism, the combination of a drum shaft having a spooling drum secured thereto, drive means including releasable transmission connections adapted to impart rotation to said drum shaft, braking means including releasable transmission connections adapted to impede rotation of said drum shaft, and a hub element secured upon said drum shaft, said element being operatively common to said driving and said braking transmission connections.

6. In a hoisting mechanism, the combination of a drum shaft and a brake shaft positioned in substantially coaxial alignment, a spooling drum fixed on said drum shaft, a fluid type brake operatively connected to said brake shaft, releasable coupling means adapted to form a driving connection between said shafts whereby the fluid type brake may act to impede rotation of the drum, said coupling means including a hub element secured on said drum shaft, a driving element rotatably mounted on the drum shaft, and releasable clutch means adapted to form a driving connection between said driving element and the hub element, whereby the driving element may impart rotation to the drum shaft.

7. In a hoisting mechanism, the combination of a spooling drum, means including spaced bearing means for rotatably supporting said spooling drum, a power transmission element non-rotatably associated with said spooling drum, drive means including releasable transmission connections adapted to impart rotation to said spooling drum, and braking means including releasable transmission connections adapted to impede rotation of said spooling drum, said power transmission element being operatively common to said driving and said braking transmission connections.

8. In a hoisting mechanism, the combination of a shaft, spaced bearings for supporting said shaft, a spooling drum secured upon said shaft intermediate said bearings, said shaft having a taper portion adjacent one end thereof, a hub element provided with a taper bore adapted to seat on the taper portion of the shaft, key means to prevent relative rotation of the shaft, and hub element, a driving member, a braking member, and means for selectively connecting either of said members in direct driving relation with said hub element.

9. In a hoisting mechanism, the combination of a shaft, a spooling drum secured upon said shaft, a taper surface on said shaft adjacent one end thereof, a hub element provided with a taper bore adapted to seat on said taper surface, key means to prevent relative rotation of the shaft and hub element, an annular series of internal spline teeth on said hub element, an annular series of external spline teeth on said hub element, a driver member, clutch means for selectively connecting the driver member with one of said series of spline teeth, a braking member, and additional clutch means for selectively connecting the braking member with the other of said series of spline teeth.

JOHN D. SPALDING.